US008449161B2

(12) United States Patent
Igoe et al.

(10) Patent No.: US 8,449,161 B2
(45) Date of Patent: May 28, 2013

(54) LUMINOUS DECORATIVE VEHICLE TRIM INSERT

(75) Inventors: Denis Patrick Igoe, Livonia, MI (US); Stuart C. Salter, White Lake, MI (US); Cornel Lewis Gardner, Romulus, MI (US); Jeffrey Singer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 502 days.

(21) Appl. No.: 12/728,291

(22) Filed: Mar. 22, 2010

(65) Prior Publication Data

US 2011/0228553 A1 Sep. 22, 2011

(51) Int. Cl.
*F21V 7/04* (2006.01)

(52) U.S. Cl.
USPC .......................................... 362/558; 362/487

(58) Field of Classification Search
USPC ....................................................... 362/558
See application file for complete search history.

(56) References Cited

U.S. PATENT DOCUMENTS

| | | | |
|---|---|---|---|
| 2,710,333 A | 6/1955 | Yates | |
| 2,808,502 A | 10/1957 | Large | |
| 4,670,819 A | 6/1987 | Boerema et al. | |
| 4,841,946 A * | 6/1989 | Marks | 126/618 |
| 4,864,473 A | 9/1989 | Tokarz et al. | |
| 5,013,967 A | 5/1991 | Hirotaka et al. | |
| 5,343,013 A | 8/1994 | Karube et al. | |
| 5,434,757 A | 7/1995 | Kashiwagi | |
| 5,641,221 A | 6/1997 | Schindele et al. | |
| 6,160,475 A | 12/2000 | Hornung et al. | |
| 6,217,201 B1 | 4/2001 | Hulse | |
| 6,419,306 B2 | 7/2002 | Sano et al. | |
| 6,464,381 B2 | 10/2002 | Anderson, Jr. et al. | |
| 6,517,226 B1 | 2/2003 | Zimmermann et al. | |
| 6,594,417 B1 | 7/2003 | Hulse | |
| 6,652,128 B2 | 11/2003 | Misaras | |
| 6,773,129 B2 | 8/2004 | Anderson, Jr. et al. | |
| 7,150,550 B2 | 12/2006 | Bogdan et al. | |
| 7,156,437 B2 | 1/2007 | Cowelchuk et al. | |
| 7,237,933 B2 | 7/2007 | Radu et al. | |
| 7,287,885 B2 | 10/2007 | Radu et al. | |
| 7,387,397 B2 | 6/2008 | Konet et al. | |
| 7,445,350 B2 | 11/2008 | Konet et al. | |
| 7,534,017 B2 | 5/2009 | Barowski et al. | |
| 2005/0213351 A1 | 9/2005 | Yang | |
| 2007/0177397 A1* | 8/2007 | Sakakibara et al. | 362/488 |
| 2008/0068857 A1* | 3/2008 | Meinke et al. | 362/546 |
| 2008/0253140 A1 | 10/2008 | Fleischmann et al. | |
| 2009/0134661 A1 | 5/2009 | Sugiura et al. | |
| 2009/0180292 A1 | 7/2009 | Yang | |
| 2009/0196058 A1 | 8/2009 | Ishida et al. | |
| 2009/0257241 A1 | 10/2009 | Meinke et al. | |

FOREIGN PATENT DOCUMENTS

EP    1110822 A2    6/2001

* cited by examiner

*Primary Examiner* — Mary Ellen Bowman
(74) *Attorney, Agent, or Firm* — Vichit Chea Price Heneveld LLP

(57) ABSTRACT

A luminous decorative vehicle trim insert having an opaque carrier structure. A reflective layer is disposed over the opaque carrier structure. A light pipe is adjacent the reflective layer and operably connected to a light source. An optic layer is disposed in the light pipe. A total internal reflection (TIR) protective layer is disposed over the light pipe. A diffusing layer is disposed over the TIR protective layer. A decorative transmitting layer is disposed over the diffusing layer. An optic layer creates a luminous effect in the trim insert visible only when the light source is activated. An environmental layer is disposed over the transmitting layer.

22 Claims, 2 Drawing Sheets

LUMINOUS DECORATIVE VEHICLE TRIM INSERT

FIELD OF THE INVENTION

The present invention generally relates to a decorative trim insert, and more particularly relates to a luminous decorative trim insert for use in vehicles.

BACKGROUND OF THE PRESENT INVENTION

Trim inserts are frequently used in vehicles to provide an aesthetically appealing appearance to the interior of the vehicle.

SUMMARY OF THE PRESENT INVENTION

One aspect of the present invention includes a luminous decorative vehicle trim insert having an opaque carrier structure. A reflective layer is disposed over the opaque carrier structure. A light pipe is adjacent the reflective layer and operably connected to a light source. A laser etched optic is disposed in the light pipe. A total internal reflection (TIR) protective layer is disposed over the light pipe. A diffusing layer is disposed over the TIR protective layer. A transmitting layer is disposed over the diffusing layer. The laser etched optic is visible only when the light source is activated. An environmental layer is disposed over the transmitting layer.

Another aspect of the present invention includes a luminous decorative vehicle trim insert having a molded light pipe operably connected to a light source and having an opaque housing. A TIR protective layer is disposed over the light pipe. A diffusing layer is disposed over the TIR protective layer. A transmitting layer is disposed over the diffusing layer. A dispersive optic is disposed in the transmitting layer. The dispersive optic is substantially visible only when the light source is activated.

Yet another aspect of the present invention includes a luminous decorative vehicle trim insert having an opaque carrier structure. A reflective layer is adjacent the opaque carrier structure. A dispersive optic layer is disposed over the reflective layer. A light pipe is adjacent the dispersive optic layer and operably connected to a light source. The dispersive optic layer is visible only when the light source is activated. A TIR protective layer, a diffusing layer, and a transmitting layer are disposed over the light pipe. The effect of the diffusing layer is visible only when the light source is activated.

Yet another aspect of the present invention includes a luminous decorative vehicle trim insert incorporating a molded light pipe mechanically affixed to an opaque housing and operably connected to a light source. Between the opaque housing and light pipe, a layer of dispersive optics is affixed to the light pipe, which effects the illumination of subsequent layers, serving to initiate the unique lit versus unlit decorative trim appearance. A TIR protective layer is disposed over the light pipe. A light diffusing layer is disposed over the TIR protective layer. A transmitting layer is disposed over the diffusing layer. An environmental protective layer is disposed over the transmitting layer. The final protective layer can be replaced by applied fabric or metal. Indicia may be integrated in the transmitting layer to effect unique decorative shapes optionally visible only when the light source is activated.

Still another aspect of the present invention includes a luminous decorative vehicle trim insert including an opaque attachment and carrier structure. A reflective layer is disposed between the light pipe and the opaque carrier structure. The light pipe is operably connected to a light source. Dispersive optic elements are positioned within the three-dimensional material matrix of the light pipe. A TIR protective layer is disposed over the light pipe. A light diffusing layer is disposed over the TIR protective layer. A transmitting layer is disposed over the diffusing layer. An environmental protective layer is disposed over the transmitting layer. The final protective layer can be replaced by applied fabric or metal. The indicia integrated in the transmitting layer is visible only when the light source is activated.

Yet another aspect of the present invention includes a method for making a luminous decorative vehicle trim insert including an opaque attachment and carrier structure. A reflective layer is adjacent the opaque carrier structure. A TIR protective layer is disposed over the reflective layer. A light pipe is adjacent the TIR protective layer and operably connected to a light source. A second TIR protective layer is disposed over the light pipe. A light diffusing layer is disposed over the TIR protective layer. A transmitting layer is disposed over the diffusing layer. An environmental protective layer is disposed over the transmitting layer. The final protective layer can be replaced by applied fabric or metal. The indicia, integrated in the transmitting layer, is visible only when the light source is activated.

These and other aspects, objects, and features of the present invention will be understood and appreciated by those skilled in the art upon studying the following specification, claims, and appended drawings.

DETAILED DESCRIPTION OF EMBODIMENTS

Figure 1:
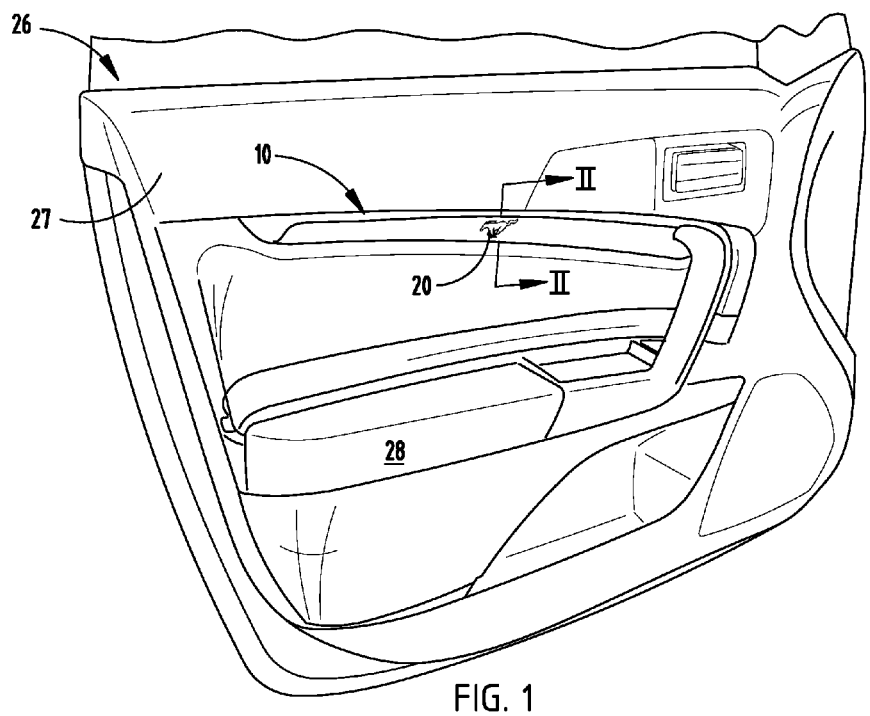
FIG. 1 is a top perspective view of a luminous decorative vehicle trim insert installed in a vehicle door.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
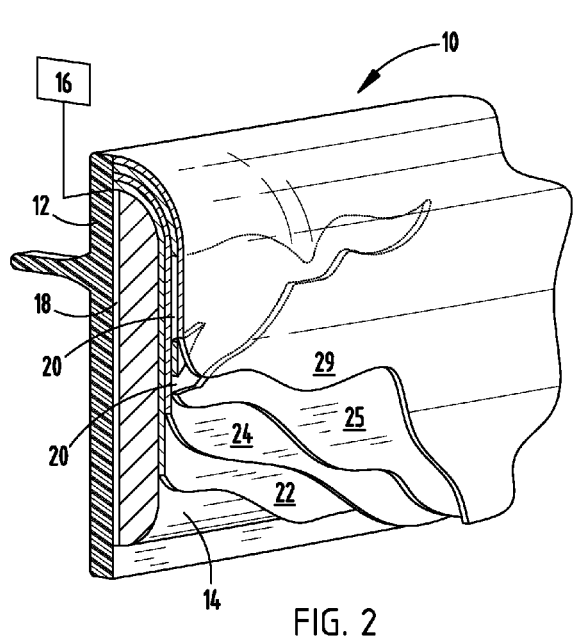
FIG. 2 is a side cross-sectional view of one embodiment of a luminous decorative vehicle trim insert.

Referring to FIGS. 1 and 2, the reference numeral 10 generally designates a luminous decorative vehicle trim insert including an opaque housing 12. A molded light pipe 14 is operably connected to a light source 16. A gap 18 is defined by the space between the opaque housing 12 and the molded light pipe 14. Dispersive optics 20 are incorporated into the light pipe 14 adjacent the gap 18. A TIR protective layer 22 is disposed over the light pipe 14. A light diffusing layer 24 is disposed over the TIR protective layer 22. The luminous decoration is substantially visible only when the light source 16 is activated.

Referring again to FIG. 1, the luminous decorative vehicle trim insert 10 is designed for use in any of a variety of positions in a vehicle 26, including the dash, doors 27, armrests 28, cup holders, etc.

Figure 3:
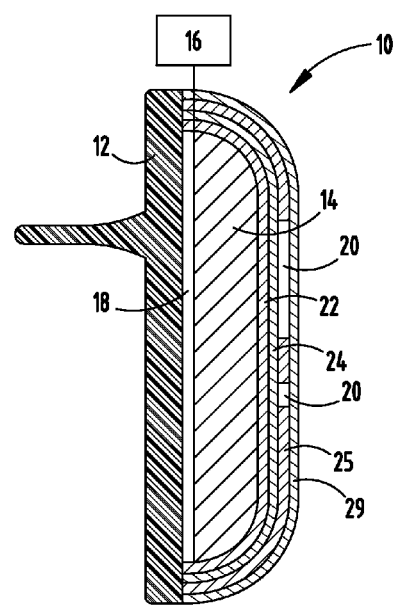
FIG. 3 is an enlarged view of the luminous decorative vehicle trim insert of FIG. 2.

Referring now to the embodiment illustrated in FIGS. 2 and 3, the luminous decorative vehicle trim insert 10 includes a relatively thin cross-section and is operable both during the day and/or at night time. During the day, the light output from the light source 16 increases such that the decorative luminous effect is visible, despite the large quantity of ambient light in the interior of the vehicle 26. At night, when ambient light has diminished, the light source 16 lowers the total amount of light output to complement the lower level of ambient light. Of course, the light source 16 may also be activated only during the day, or only at night, or it can be deactivated completely and provide no light to the luminous decorative vehicle trim insert 10.

Referring again to FIGS. 2 and 3, the light diffusing layer 24 extends over the internal TIR protective layer 22, either or both of which are a laminate film, among other possible materials. It is contemplated that layers 22 and 24 may be combined into a single identically functional layer or applied film. The transmitting layer 25 is positioned over the light diffusing layer 24 and may also be a decorative film, fabric, or metal. The transmitting layer 25 is contemplated to have one of a variety of possible finishes. For example, the transmitting layer 25 may include a variety of metallic appearances, such as chrome, gold, aluminum, etc., with a plethora of possible textured finishes, a darkened or black appearance, a wood grain appearance, etc. An environmental layer or laminate 29 is positioned over the transmitting layer 25, when fabric or metal is not employed, to protect the transmitting layer 25 from damage and wear during use. A highly reflective coating is applied to the opaque housing 12 to increase luminous efficiency. Alternatively, the opaque housing 12, itself may be developed from a material that is highly reflective.

Referring once again to FIGS. 2 and 3, the light source 16 may be an external light source that is plugged into a receiving element on the luminous decorative vehicle trim insert 10. The light pipe 14 is operably connected with the light source 16 and may be constructed of an acrylic, a polycarbonate, a transparent plastic, etc. Alternatively, the light source 16 may be internal to the luminous decorative vehicle trim insert 10, such that the light source 16 needs only a power source to illuminate the luminous decorative vehicle trim insert 10. The dispersive optic 20 is disposed in the transmitting layer 25 and refracts light as the light passes through the light pipe 14. It is contemplated that the dispersive optic 20 could also be disposed in either the light diffusing layer 24 or the TIR protective layer 22. The dispersive optic 20 can be of nearly any shape or size and is limited only by the size constraints of the luminous decorative vehicle trim insert 10.

Figure 4:
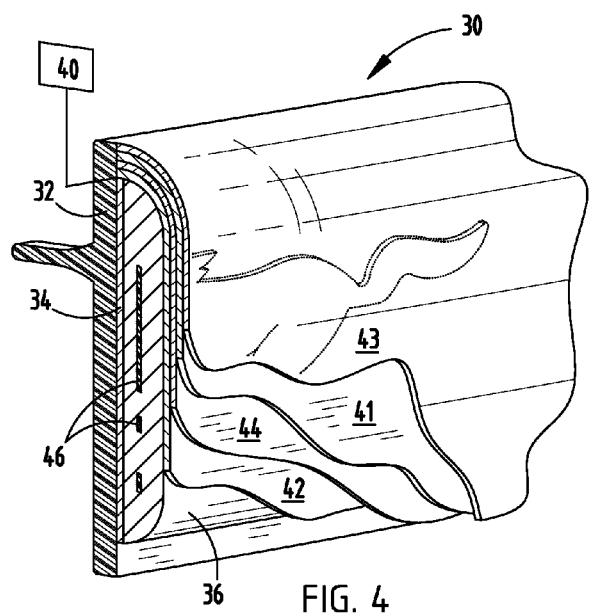
FIG. 4 is a side cross-sectional view of one embodiment of a luminous decorative vehicle trim insert.
Figure 5:
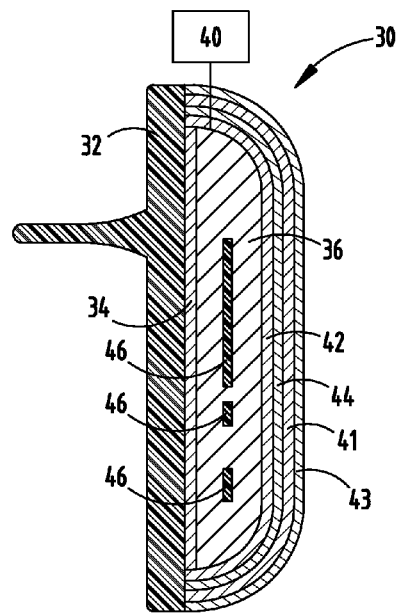
FIG. 5 is an enlarged view of the luminous decorative vehicle trim insert of FIG. 4.

Referring now to another embodiment, as shown in FIGS. 4 and 5, a luminous decorative vehicle trim insert 30 includes an opaque attachment and carrier structure 32 with a reflective layer 34 adjacent the opaque carrier structure 32. A light pipe 36 is positioned adjacent to the reflective layer 34 and is operably connected to a light source 40. A TIR protective layer 42 is disposed over the light pipe 36 and a light diffusing layer 44 is disposed over the TIR protective layer 42. A transmitting layer 41 extends over the diffusing layer 44. The transmitting layer 41 is contemplated to have one of a variety of possible finishes. For example, the transmitting layer 41 may include a variety of metallic appearances, such as chrome, gold, aluminum, etc., with a plethora of possible textured finishes, a darkened or black appearance, a wood grain appearance, etc. An environmental protective layer or laminate 43 is positioned over the transmitting layer 41, when fabric or metal is not employed, to protect the transmitting layer 41 from damage and wear during use.

An interspersed laser etching 46 is disposed inside the light pipe 36, specifically within the material matrix of the light pipe 36. The light pipe 36 may be constructed of an acrylic, a polycarbonate, a transparent plastic, etc. When light from the light source 40 enters the light pipe 36 and encounters the laser etching 46, the light disperses in a prescribed manner Light then transmits through the TIR protective layer 42, the diffusing layer 44, the transmitting layer 41, and finally the environmental protective layer 43. It is contemplated that the reflective layer 34 may not be present, and that the opaque carrier structure 32 may be constructed from a reflective material.

Referring again to the embodiment of FIGS. 4 and 5, when light entering light pipe 36 encounters the laser etching 46, a specific predetermined indicia is illuminated. It is contemplated that the diffusing layer 44 can be removed from the luminous decorative vehicle trim insert 10 when the luminous laser etching 46 is incorporated. However, the TIR protective layer 42, transmitting layer 41, and environmental protective layer 43 are still present. The transmitting layer 41 may take on a variety of surface finishes, as described in the previous embodiment with regard to the transmitting layer 25. It is contemplated that the TIR protective layer 42, the transmitting layer 41, and the environmental protective layer 43 may be combined into a single identically functional layer or incorporated into an applied film.

Figure 6:
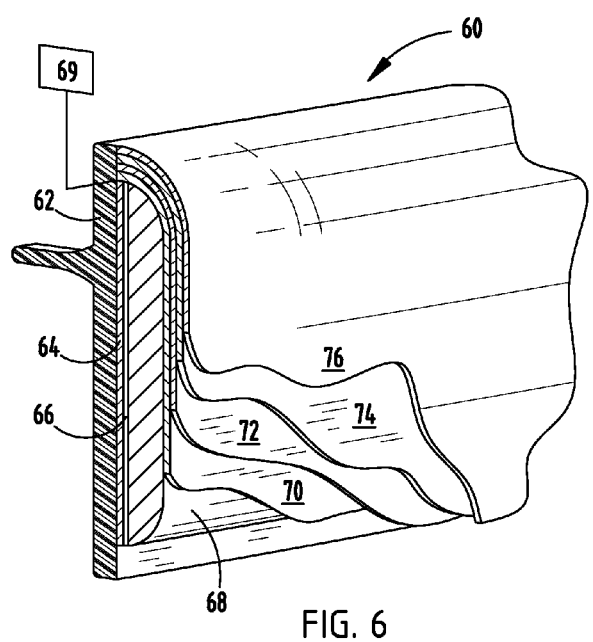
FIG. 6 is a side cross-sectional view of one embodiment of a luminous decorative vehicle trim insert.
Figure 7:
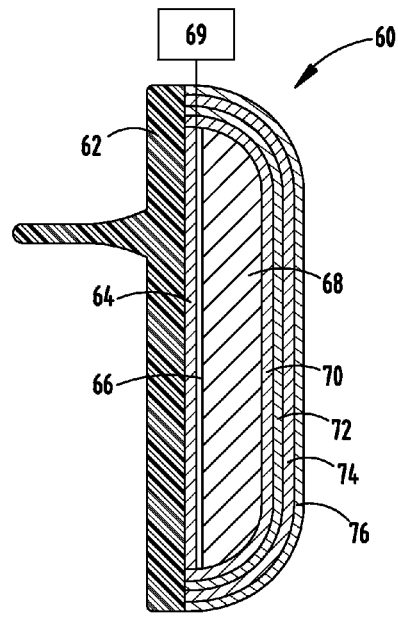
FIG. 7 is an enlarged view of the luminous decorative vehicle trim insert of FIG. 6.

Referring now to the embodiment illustrated in FIGS. 6 and 7, a luminous decorative vehicle trim insert 60 includes an opaque attachment and carrier structure 62 attached to the inside of the vehicle 26. A reflective layer 64 extends over the opaque carrier structure 62 and a film layer 66 extends over the reflective layer 64. The film layer 66 is applied to a light pipe 68 and has specific graduated texturing, etching, paint, ink, or silk screen application, etc., are disposed on the reflective layer 64. The light pipe 68 is operably connected with a light source 69. A TIR protective layer 70 is disposed over the light pipe 68. The light pipe 68 may be constructed of an acrylic, plastic, etc. A diffusing layer 72 extends over the protective layer 70 and a transmitting layer 74 extends over the diffusing layer 72. It is contemplated that the transmitting layer 74 could be a plastic material, fabric, or metal material, etc. Optionally, an environmental protective layer 76 may extend over the transmitting layer 74. When light from the light source 69 is activated, the light extends through the light pipe 68 and encounters specific irregularities on the film layer 66 from paint, ink, etc. it is redirected, dispersed through the various layers above the light pipe 68 and the defined luminous decorative effect is visible to the occupant. It is contemplated that the reflective layer 64 may not be present if the opaque carrier structure 62 is formed using a highly reflective material.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A luminous decorative vehicle trim insert comprising:
   an opaque carrier structure;

a reflective layer disposed over the opaque carrier structure;
a light pipe adjacent the reflective layer and operably connected to a light source;
a laser etched optic disposed in the light pipe;
a TIR protective layer disposed over the light pipe;
a diffusing layer disposed over the TIR protective layer;
a transmitting layer disposed over the diffusing layer, wherein the laser etched optic is visible only when the light source is activated; and
an environmental layer disposed over the transmitting layer.

2. The luminous decorative vehicle trim insert of claim 1, wherein the transmitting layer includes one of a metallic appearance, a wood grain appearance, or a colored plastic appearance.

3. The luminous decorative vehicle trim insert of claim 1, wherein the opaque carrier structure is coated with a highly reflective material.

4. The luminous decorative vehicle trim insert of claim 1, wherein the light source includes a dim light output condition and a bright light output condition.

5. The luminous decorative vehicle trim insert of claim 1, wherein the light source is integral with the luminous decorative vehicle trim insert.

6. The luminous decorative vehicle trim insert of claim 1, wherein the TIR protective layer and the diffusing layer may be integrated into a single integral layer.

7. The luminous decorative vehicle trim insert of claim 1, wherein the transmitting layer and the protective layer are integrated into a single integral layer.

8. A luminous decorative vehicle trim insert comprising:
a molded light pipe operably connected to a light source and having an opaque housing;
a TIR protective layer disposed over the light pipe;
a diffusing layer disposed over the TIR protective layer;
a transmitting layer disposed over the diffusing layer; and
a dispersive optic disposed in the transmitting layer, wherein the dispersive optic is substantially visible only when the light source is activated.

9. The luminous decorative vehicle trim insert of claim 8, wherein an environmental layer is disposed over the transmitting layer.

10. The luminous decorative vehicle trim insert of claim 8, wherein the transmitting layer includes one of a metallic appearance, a wood grain appearance, or a colored plastic appearance.

11. The luminous decorative vehicle trim insert of claim 8, wherein the opaque housing is coated with a highly reflective material.

12. The luminous decorative vehicle trim insert of claim 8, wherein the light source includes a dim light output condition and a bright light output condition.

13. The luminous decorative vehicle trim insert of claim 8, wherein the light source is integral with the luminous decorative vehicle trim insert.

14. The luminous decorative vehicle trim insert of claim 8, wherein the TIR protective layer and the diffusing layer are integrated into a single integral layer.

15. The luminous decorative vehicle trim insert of claim 9, wherein the transmitting layer and the protective layer are integrated into a single integral layer.

16. A luminous decorative vehicle trim insert comprising:
an opaque carrier structure;
a reflective layer adjacent the opaque carrier structure;
a dispersive optic layer disposed over the reflective layer;
a light pipe adjacent the dispersive optic layer and operably connected to a light source, wherein the dispersive optic layer is visible only when the light source is activated; and
a TIR protective layer, a diffusing layer, and a transmitting layer disposed over the light pipe.

17. The luminous decorative vehicle trim insert of claim 16, wherein the transmitting layer includes one of a metallic appearance, a wood grain appearance, or a colored plastic appearance.

18. The luminous decorative vehicle trim insert of claim 16, wherein the opaque carrier structure is coated with a highly reflective material.

19. The luminous decorative vehicle trim insert of claim 16, wherein the light source includes a dim light output condition and a bright light output condition.

20. The luminous decorative vehicle trim insert of claim 16, wherein the light source is integral with the luminous decorative vehicle trim insert.

21. The luminous decorative vehicle trim insert of claim 16, wherein the TIR protective layer and diffusing layer may be integrated into a single layer or film.

22. The luminous decorative vehicle trim insert of claim 16, wherein the transmitting layer and an environmental protective layer are integrated into a single layer or film.

* * * * *